United States Patent
Nieminen

(10) Patent No.: US 6,665,692 B1
(45) Date of Patent: Dec. 16, 2003

(54) METHOD FOR UPDATING A LINEAR FEEDBACK SHIFT REGISTER OF CODE GENERATOR

(75) Inventor: Esko Nieminen, Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/567,830

(22) Filed: May 9, 2000

(30) Foreign Application Priority Data

May 10, 1999 (FI) ................................................ 991073

(51) Int. Cl.[7] .............................................. G06F 1/02
(52) U.S. Cl. ...................................... 708/250; 708/252
(58) Field of Search .............................. 708/250, 251, 708/252, 253, 254, 255, 256

(56) References Cited

U.S. PATENT DOCUMENTS

| | | | | |
|---|---|---|---|---|
| 5,046,036 A | * | 9/1991 | Tezuka | 708/253 |
| 5,434,807 A | * | 7/1995 | Yoshida | 708/253 |
| 5,596,516 A | * | 1/1997 | Higashi et al. | 708/252 |
| 5,835,528 A | | 11/1998 | Barron | |
| 6,038,577 A | * | 3/2000 | Burshtein | 708/252 |

FOREIGN PATENT DOCUMENTS

WO      WO 96/36137      11/1996

* cited by examiner

*Primary Examiner*—Chuong Dinh Ngo
(74) *Attorney, Agent, or Firm*—Perman & Green, LLP

(57) ABSTRACT

The invention relates to three different methods for updating a linear feedback shift register of a code generator, and code generators applying the methods. In the basic method a Galois-type linear feedback shift register of a code generator is updated to a target state which is at a known offset from a unit state. The basic method comprises the following: (302) generating a binary offset number illustrating the offset; (304) generating a counter showing the number of bits in the binary offset number; (306) initializing a temporary state with the unit state; (308) iterating as long as the counter value is higher than zero: (310) multiplying the temporary state by itself by applying a Galois Field multiplication; (312) shifting the temporary state one state forward from the current temporary state if the value of the bit shown by the counter is one; and (314) decrementing the counter value by one; (316) in the end, when the counter has reached the value zero, setting the temporary state as the target state. The described basic method is also employed in methods for updating a Galois-type/Fibonacci-type linear feedback shift register of a code generator to a new state which is at a known offset from a current state.

16 Claims, 11 Drawing Sheets

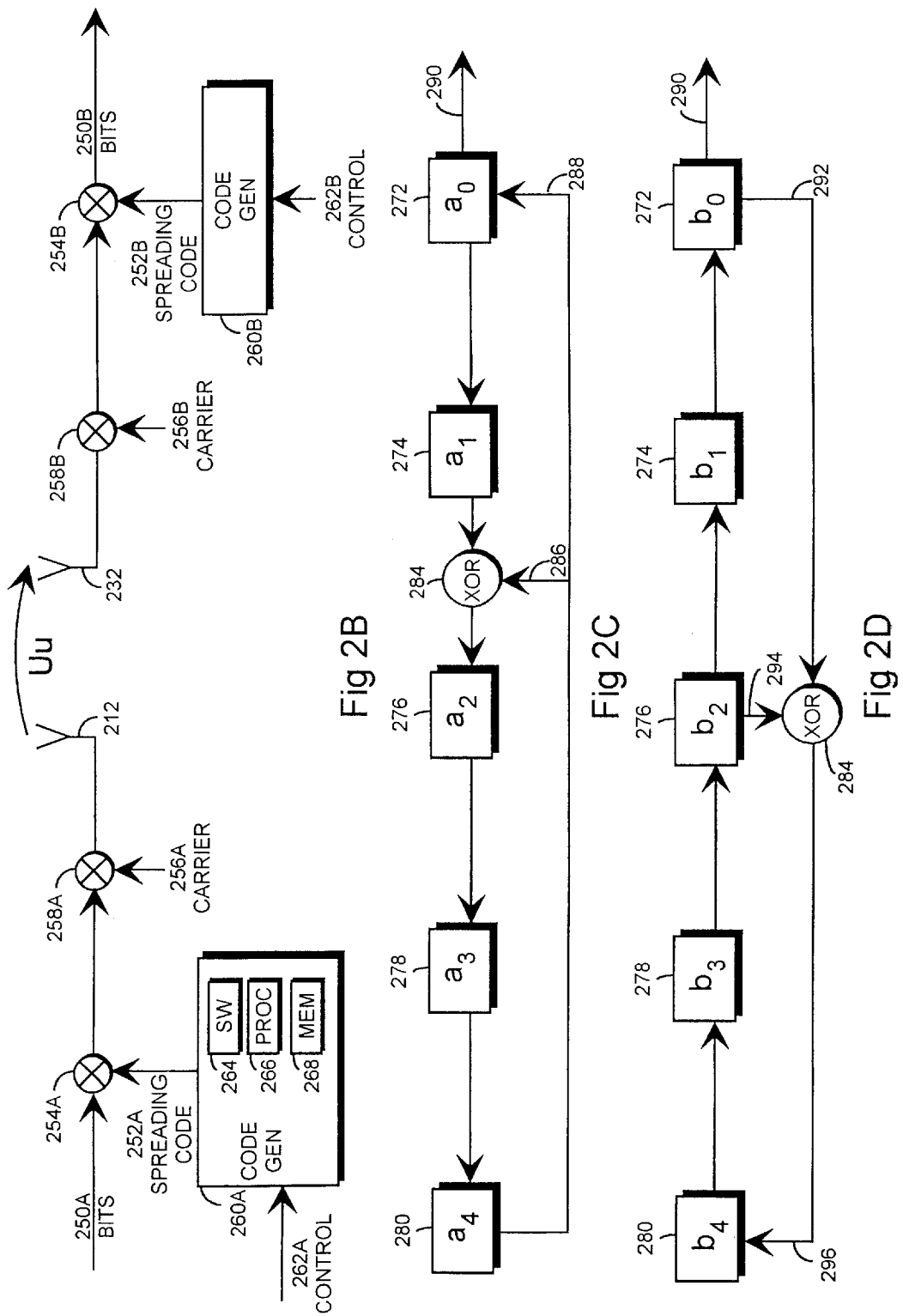

| ORDINAL NUMBER OF STATE | LFSR STATE 4 | 3 | 2 | 1 | 0 | EXAMPLE OF FIG 3A & FIG 4B | EXAMPLE OF FIG 3B & FIG 4C |
|---|---|---|---|---|---|---|---|
| 0 | 0 | 0 | 0 | 0 | 1 | UNIT STATE | UNIT STATE |
| 1 | 0 | 0 | 0 | 1 | 0 | | |
| 2 | 0 | 0 | 1 | 0 | 0 | | |
| 3 | 0 | 1 | 0 | 0 | 0 | | |
| 4 | 1 | 0 | 0 | 0 | 0 | | |
| 5 | 0 | 0 | 1 | 0 | 1 | | |
| 6 | 0 | 1 | 0 | 1 | 0 | | |
| 7 | 1 | 0 | 1 | 0 | 0 | | |
| 8 | 0 | 1 | 1 | 0 | 1 | | CURRENT STATE |
| 9 | 1 | 1 | 0 | 1 | 0 | | |
| 10 | 1 | 0 | 0 | 0 | 1 | OFFSET | |
| 11 | 0 | 0 | 1 | 1 | 1 | | |
| 12 | 0 | 1 | 1 | 1 | 0 | | |
| 13 | 1 | 1 | 1 | 0 | 0 | | |
| 14 | 1 | 1 | 1 | 0 | 1 | | |
| 15 | 1 | 1 | 1 | 1 | 1 | | |
| 16 | 1 | 1 | 0 | 1 | 1 | | |
| 17 | 1 | 0 | 0 | 1 | 1 | | TEMP STATE |
| 18 | 0 | 0 | 0 | 1 | 1 | | OFFSET |
| 19 | 0 | 0 | 1 | 1 | 0 | | |
| 20 | 0 | 1 | 1 | 0 | 0 | | |
| 21 | 1 | 1 | 0 | 0 | 0 | TARGET STATE | |
| 22 | 1 | 0 | 0 | 0 | 1 | | |
| 23 | 0 | 1 | 1 | 1 | 1 | | |
| 24 | 1 | 1 | 1 | 1 | 0 | | |
| 25 | 1 | 1 | 0 | 0 | 1 | | NEW STATE |
| 26 | 1 | 0 | 1 | 1 | 1 | | |
| 27 | 0 | 1 | 0 | 1 | 1 | | |
| 28 | 1 | 0 | 1 | 1 | 0 | | |
| 29 | 0 | 1 | 0 | 0 | 1 | | |
| 30 | 1 | 0 | 0 | 1 | 0 | | |
| 0 | 0 | 0 | 0 | 0 | 1 | | |

Fig 4A

| OPERATION | LFSR | | | | | ORDINAL NUMBER |
|---|---|---|---|---|---|---|
| | 4 | 3 | 2 | 1 | 0 | |
| UNIT STATE | 0 | 0 | 0 | 0 | 1 | 0 |
| SQUARE | 0 | 0 | 0 | 0 | 1 | 0 |
| SHIFT | 0 | 0 | 0 | 1 | 0 | 1 |
| SQUARE | 0 | 0 | 1 | 0 | 0 | 2 |
| NO SHIFT | | | | | | |
| SQUARE | 1 | 0 | 0 | 0 | 0 | 4 |
| SHIFT | 0 | 0 | 1 | 0 | 1 | 5 |
| SQUARE | 1 | 0 | 0 | 0 | 1 | 10 |
| NO SHIFT | | | | | | |
| SQUARE | 0 | 1 | 1 | 0 | 0 | 20 |
| SHIFT | 1 | 1 | 0 | 0 | 0 | 21 |

OFFSET: 1 0 1 0 1

Fig 4B

| TAKEN INTO ACCOUNT? | LFSR | | | | | ORDINAL NUMBER |
|---|---|---|---|---|---|---|
| | 4 | 3 | 2 | 1 | 0 | |
| YES | 1 | 1 | 0 | 1 | 0 | 9 |
| YES | 1 | 0 | 0 | 0 | 1 | 10 |
| NO | 0 | 0 | 1 | 1 | 1 | 11 |
| NO | 0 | 1 | 1 | 1 | 0 | 12 |
| NO | 1 | 1 | 1 | 0 | 0 | 13 |
| XOR | 0 | 1 | 0 | 1 | 1 | 9+18=27 |

THE 18TH STATE: 0 0 0 1 1

Fig 4C

| OPERATION | LFSR | | | | | ORDINAL NUMBER |
|---|---|---|---|---|---|---|
| | 4 | 3 | 2 | 1 | 0 | |
| | 0 | 0 | 1 | 1 | 0 | 9 |
| | 0 | 0 | 0 | 1 | 1 | 18 |
| 9 AND 18 | 0 | 0 | 0 | 1 | 0 | |
| | 0 | 0 | 1 | 1 | 0 | 9 |
| | 0 | 0 | 1 | 1 | 0 | 19 |
| 9 AND 19 | 0 | 0 | 1 | 1 | 0 | |
| | 0 | 0 | 1 | 1 | 0 | 9 |
| | 0 | 1 | 1 | 0 | 0 | 20 |
| 9 AND 20 | 0 | 0 | 1 | 0 | 0 | |
| | 0 | 0 | 1 | 1 | 0 | 9 |
| | 1 | 1 | 0 | 0 | 0 | 21 |
| 9 AND 21 | 0 | 0 | 0 | 0 | 0 | |
| | 0 | 0 | 1 | 1 | 0 | 9 |
| | 1 | 0 | 1 | 0 | 1 | 22 |
| 9 AND 22 | 0 | 0 | 1 | 0 | 0 | |

| FIBONACCI-TYPE LFSR STATE | | | | | ORDINAL NUMBER OF STATE | GALOIS-TYPE LFSR STATE | | | | |
|---|---|---|---|---|---|---|---|---|---|---|
| 4 | 3 | 2 | 1 | 0 | | 4 | 3 | 2 | 1 | 0 |
| 0 | 0 | 0 | 0 | 1 | 0 | 0 | 0 | 0 | 0 | 1 |
| 1 | 0 | 0 | 0 | 0 | 1 | 0 | 0 | 0 | 1 | 0 |
| 0 | 1 | 0 | 0 | 0 | 2 | 0 | 0 | 1 | 0 | 0 |
| 0 | 0 | 1 | 0 | 0 | 3 | 0 | 1 | 0 | 0 | 0 |
| 1 | 0 | 0 | 1 | 0 | 4 | 1 | 0 | 0 | 0 | 0 |
| 0 | 1 | 0 | 0 | 1 | 5 | 0 | 0 | 1 | 0 | 1 |
| 1 | 0 | 1 | 0 | 0 | 6 | 0 | 1 | 0 | 1 | 0 |
| 1 | 1 | 0 | 1 | 0 | 7 | 1 | 0 | 1 | 0 | 0 |
| 0 | 1 | 1 | 0 | 1 | 8 | 0 | 1 | 1 | 0 | 1 |
| 0 | 0 | 1 | 1 | 0 | 9 | 1 | 1 | 0 | 1 | 0 |
| 1 | 0 | 0 | 1 | 1 | 10 | 1 | 0 | 0 | 0 | 1 |
| 1 | 1 | 0 | 0 | 1 | 11 | 0 | 0 | 1 | 1 | 1 |
| 1 | 1 | 1 | 0 | 0 | 12 | 0 | 1 | 1 | 1 | 0 |
| 1 | 1 | 1 | 1 | 0 | 13 | 1 | 1 | 1 | 0 | 0 |
| 1 | 1 | 1 | 1 | 1 | 14 | 1 | 1 | 1 | 0 | 1 |
| 0 | 1 | 1 | 1 | 1 | 15 | 1 | 1 | 1 | 1 | 1 |
| 0 | 0 | 1 | 1 | 1 | 16 | 1 | 1 | 0 | 1 | 1 |
| 0 | 0 | 0 | 1 | 1 | 17 | 1 | 0 | 0 | 1 | 1 |
| 1 | 0 | 0 | 0 | 1 | 18 | 0 | 0 | 0 | 1 | 1 |
| 1 | 1 | 0 | 0 | 0 | 19 | 0 | 0 | 1 | 1 | 0 |
| 0 | 1 | 1 | 0 | 0 | 20 | 0 | 1 | 1 | 0 | 0 |
| 1 | 0 | 1 | 1 | 0 | 21 | 1 | 1 | 0 | 0 | 0 |
| 1 | 1 | 0 | 1 | 1 | 22 | 1 | 0 | 1 | 0 | 1 |
| 1 | 1 | 1 | 0 | 1 | 23 | 0 | 1 | 1 | 1 | 1 |
| 0 | 1 | 1 | 1 | 0 | 24 | 1 | 1 | 1 | 1 | 0 |
| 1 | 0 | 1 | 1 | 1 | 25 | 1 | 1 | 0 | 0 | 1 |
| 0 | 1 | 0 | 1 | 1 | 26 | 1 | 0 | 1 | 1 | 1 |
| 1 | 0 | 1 | 0 | 1 | 27 | 0 | 1 | 0 | 1 | 1 |
| 0 | 1 | 0 | 1 | 0 | 28 | 1 | 0 | 1 | 1 | 0 |
| 0 | 0 | 1 | 0 | 1 | 29 | 0 | 1 | 0 | 0 | 1 |
| 0 | 0 | 0 | 1 | 0 | 30 | 1 | 0 | 0 | 1 | 0 |
| 0 | 0 | 0 | 0 | 1 | 0 | 0 | 0 | 0 | 0 | 1 |

Fig 4D

METHOD FOR UPDATING A LINEAR FEEDBACK SHIFT REGISTER OF CODE GENERATOR

FIELD OF THE INVENTION

The invention relates to methods for updating a Linear Feedback Shift Register of a code generator, and to code generators using the methods. The term 'code' refers to, for example, a pseudo-noise sequence used in a radio system, such as a spreading code or scrambling code of a radio system employing code division multiple access (CDMA), or another code (used for example in an encryption system).

BACKGROUND OF THE INVENTION

In radio systems employing code division multiple access radio resources are divided between a plural number of different users on a code-division basis. The payload of each user is spread on a wide frequency band (of five megaherz, for example) by multiplying the payload by a spreading code. The receiver can separate the signal it wants to receive by multiplying the received signal by the spreading code used. Portions of the spreading code are called chips, and in fact they are bits. A chip value can be expressed with zeros and ones, or as real numbers with ones and minus ones. Chip rate is typically significantly faster, over hundred times, for example, than payload rate.

In addition to spreading codes, codes known as scrambling codes can be used. They are not necessarily used for spreading the signal any more, but for scrambling the bits of the spread signal by multiplying each bit in the signal by the corresponding scrambling code bit. Scrambling codes can be extremely long, $2^{41}-1$ chips, for example.

The spreading codes used are normally as orthogonal as possible with respect to each other. Spreading codes can be obtained for example from a Hadamard matrix. A Hadamard matrix $M_n$ is an n×n matrix (where n is an even integer) composed of zeros and ones in such a way that any matrix line differs from any other matrix line exactly at an n/2 position. Consequently, one matrix line comprises only zeros, whereas the rest of the lines are composed of an equal number of zeros and ones. When n=2, the following Hadamard matrix is obtained:

$$M_2 = \begin{bmatrix} 0 & 0 \\ 0 & 1 \end{bmatrix} \quad (1)$$

A Hadamard matrix $M_{2n}$ is generated from the Hadamard matrix $M_n$ by the following relation:

$$M_{2n} = \begin{bmatrix} M_n & M_n \\ M_n & \overline{M_n} \end{bmatrix} \quad (2)$$

where the matrix $\overline{M_n}$ is a complement of the matrix $M_n$, i.e. the zeros are replaced by ones and ones by zeros. The matrix 1 thus provides the following:

$$M_4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \quad (3)$$

Further, the matrix 3 provides the following:

$$M_8 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix} \quad (4)$$

If elements of the above described Hadamard matrices, i.e. zeros and ones, are represented by ones and minus ones, then the lines in the Hadamard matrices are orthogonal with respect to each other. If desired, the values could also be inverted, i.e. zeros could be replaced by ones and ones by zeros, but that would not change the properties of the matrix. Hence, the matrix 1 could also be presented in formats such as $$M_2 \begin{bmatrix} 1 & 1 \\ 1 & 0 \end{bmatrix}, \quad M_2 = \begin{bmatrix} 1 & 1 \\ 1 & -1 \end{bmatrix}$$

Each matrix line forms one spreading code. The length of the spreading code varies according to the desired spreading factor. The spreading codes can be numbered for example by indicating the code class of the spreading code and its ordinal number in the code class concerned. The code class can be obtained by the following equation: two to the power of code class equals the length of the spreading code, in other words, the code class is a binary logarithm of the spreading code. The matrix 4, for example, thus includes the following spreading codes (the subindex denotes the code class and the number in parenthesis is the ordinal number):

SPREADINGCODE$_3$(0)={0,0,0,0,0,0,0,0}
SPREADINGCODE$_3$(1)={0,1,0,1,0,1,0,1}
SPREADINGCODE$_3$(2)={0,0,1,1,0,0,1,1}
SPREADINGCODE$_3$(3)={0,1,1,0,0,1,1,0}
SPREADINGCODE$_3$(4)={0,0,0,0,1,1,1,1}
SPREADINGCODE$_3$(5)={0,1,0,1,1,0,1,0}
SPREADINGCODE$_3$(6)={0,0,1,1,1,1,0,0}
SPREADINGCODE$_3$(7)={0,1,1,0,1,0,0,1}

According to prior art, all short spreading codes are stored into a transceiver memory. For a code of a class 8, for example, this means that 256 different codes of 256 chips are stored into the memory, the memory space needed being 256×256 bits, i.e. a total of 65536 bits. Shorter spreading codes can be generated from the stored long codes, therefore spreading codes of lower code classes need not be separately stored.

Spreading codes can be remarkably long, $2^{41}-1$ chips for example. A technical problem that arises is how to generate the code in real time, because one and the same sequence is typically used, only different transceivers use the sequence at different stages. Ideally, the code sequence to be generated would be fully random; this is, however, not practical because both the transmitter and the receiver have to be able to generate the code sequence to be used, applying even the same timing, i.e. phase.

The code is generated by means of a code generator, for example a generator using a linear feedback shift register. WO Publication 96/36137 describes a linear feedback shift register that is used for generating what is known as an m sequence (maximal length sequence) to provide a pseudo noise sequence to be used as a code, the sequence being iterated after a sequence of $2^N-1$, where N represents the number of elements in the linear feedback shift register. The initial state is always known in linear feedback shift registers, but a problem arises from how to shift from the known initial state to a new, unknown target state which is at a known offset. In the solution described in the above publication a conversion matrix corresponding to each shift, or at least to each shift corresponding to a power of two, is stored, the conversion matrix indicating how each initial state element needs to be converted to provide target state elements. Consequently, the amount of bits stored for a spreading code of $2^{41}-1$ chips, for example, is 41×41×41 bits (the number of different powers of two × the number of linear feedback shift register elements × the length of the linear feedback shift register), i.e. 68921 bits in total.

U.S. Pat. No. 5,835,528 discloses how a feedback shift register is updated from a known current state to a new state which is at a known offset. The solution involves storing pre-calculated states that are used for updating. The solution requires memory for storing the states calculated in advance, and only states that are at an offset determined by these states can be updated.

BRIEF DESCRIPTION OF THE INVENTION

An object of the invention is to provide a method for updating a linear feedback shift register, wherein the method employs memory only a little and provides efficient calculation. This is achieved with a method for updating a Galois-type linear feedback shift register of a code generator to a target state which is at a known offset from a unit state. The method comprises the following: generating a binary offset number illustrating the offset; generating a counter showing the number of bits in the binary offset number; initializing a temporary state with the unit state; iterating as long as the counter value is higher than zero: applying a Galois Field multiplication to multiply the temporary state by itself; shifting the temporary state one state forward from the current temporary state if the value of a binary offset number bit shown by the counter is one; and decrementing the counter value by one; in the end, when the counter has reached the value zero, setting the temporary state as the target state.

The invention also relates to a method for updating a Galois-type linear feedback shift register of a code generator to a new state which is at a known offset from a known current state. The method comprises the following: generating a binary offset number illustrating the offset; generating a counter showing the number of bits in the binary offset number; initializing a temporary state with a unit state; iterating as long as the counter value is higher than zero: applying a Galois Field multiplication to multiply the temporary state by itself; shifting the temporary state one state forward from the current temporary state if the value of a binary offset number bit shown by the counter is one; and decrementing the counter value by one; in the end, when the counter has reached the value zero, performing a Galois Field multiplication between the temporary state and the current state; and setting the state obtained as a result of the multiplication as the new state.

The invention further relates to a method for updating a Fibonacci-type linear feedback shift register of a code generator to a new state which is at a known offset from a known current state. The method comprises the following: generating a binary offset number illustrating the offset; generating a counter showing the number of bits in the binary offset number; initializing a Galois-type temporary state with a unit state; iterating as long as the counter value is higher than zero: applying a Galois Field multiplication to multiply the temporary state by itself; shifting the temporary state one state forward from the current temporary state if the value of a binary offset number bit shown by the counter is one; and decrementing the counter value by one; in the end, when the counter has reached the value zero, performing a Galois Field multiplication between the Galois-type temporary state and the Fibonacci-type current state; and setting the state obtained as a result of the multiplication as the new state of the Fibonacci-type.

The invention still further relates to a code generator in a radio system, the code generator comprising the following: means for generating a binary offset number illustrating a known offset from a unit state of a Galois-type linear feedback shift register to a target state; means for generating a counter showing the number of bits in the binary offset number; means for initializing a temporary state with the unit state; means for iterating the operation of subsequent means as long as the counter value is higher than zero: means for applying a Galois Field multiplication to multiply the temporary state by itself; means for shifting the temporary state one state forward from the current temporary state, if the value of the binary offset number bit shown by the counter is one; and means for decrementing the counter value by one; means for setting, in the end, the temporary state as the target state when the counter has reached the value zero.

The invention also relates to a code generator in a radio system, the code generator comprising the following: means for generating a binary offset number illustrating a known offset from a known current state of a Galois-type linear feedback shift register of a code generator to a new state; means for generating a counter showing the number of bits in the binary offset number; means for initializing a temporary state with a unit state; means for iterating the operation of subsequent means as long as the counter value is higher than zero: means for applying a Galois Field multiplication to multiply the temporary state by itself; means for shifting the temporary state one state forward from the current temporary state if the value of the binary offset number bit shown by the counter is one; and means for decrementing the counter value by one; means for multiplying the temporary state and the current state by applying the Galois Field multiplication, and for setting the state obtained as a result of the multiplication as the new state when the counter has reached the value zero.

The invention still further relates to a code generator in a radio system, the code generator comprising the following: means for generating a binary offset number illustrating a known offset from a known current state of a Fibonacci-type linear feedback shift register to a new state; means for generating a counter showing the number of bits in the binary offset number; means for initializing a Galois-type temporary state with a unit state; means for iterating the operation of subsequent means as long as the counter value is higher than zero: means for applying a Galois Field multiplication to multiply the temporary state by itself; means for shifting the temporary state one state forward from the current temporary state, if the value of the binary offset number bit shown by the counter is one; and means for decrementing the counter value by one; means for multiplying the Galois-type temporary state and the Fibonacci-type current state by applying the Galois Field multiplication, and for setting the state obtained as a result of the multiplication as the new state of the Fibonacci-type when the counter has reached the value zero.

The dependent claims relate to the preferred embodiments of the invention.

The invention is based on applying Galois Field mathematical properties to provide efficient calculation for the processing of feedback shift registers, and on taking into account the connections between different types of feedback shift registers.

BRIEF DESCRIPTION OF THE DRAWINGS

In the following the invention will be described in greater detail in connection with preferred embodiments and with reference to the accompanying drawings, in which

FIG. 2B illustrates the processing of a spreading code at a transmitter and a receiver;

FIG. 2C illustrates an example of a simple Galois-type linear feedback shift register;

FIG. 2D illustrates an example of a simple Fibonacci-type linear feedback shift register;

FIG. 4A illustrates possible states of the feedback shift register of FIG. 2C;

FIG. 4B illustrates an example of implementing the method of FIG. 3A;

FIG. 4C illustrates an example of implementing the method of FIG. 3B by applying the Galois-type multiplication described in FIG. 3C;

FIG. 4D illustrates the states of both the Galois-type linear feedback shift register of FIG. 2C and the Fibonacci-type linear feedback shift register of FIG. 2D;

FIG. 4E illustrates an example a Galois-type multiplication between the states of the Fibonacci-type and the Galois-type.

DETAILED DESCRIPTION OF THE INVENTION

The present invention can be used in mobile telephone systems, such as those applying code division multiple access (CDMA), that use linear feedback shift registers to generate various types of codes. In the following examples, the invention is used in the Universal Mobile Telephone System (UMTS) without, however, restricting the invention thereto.

Figure 1A:
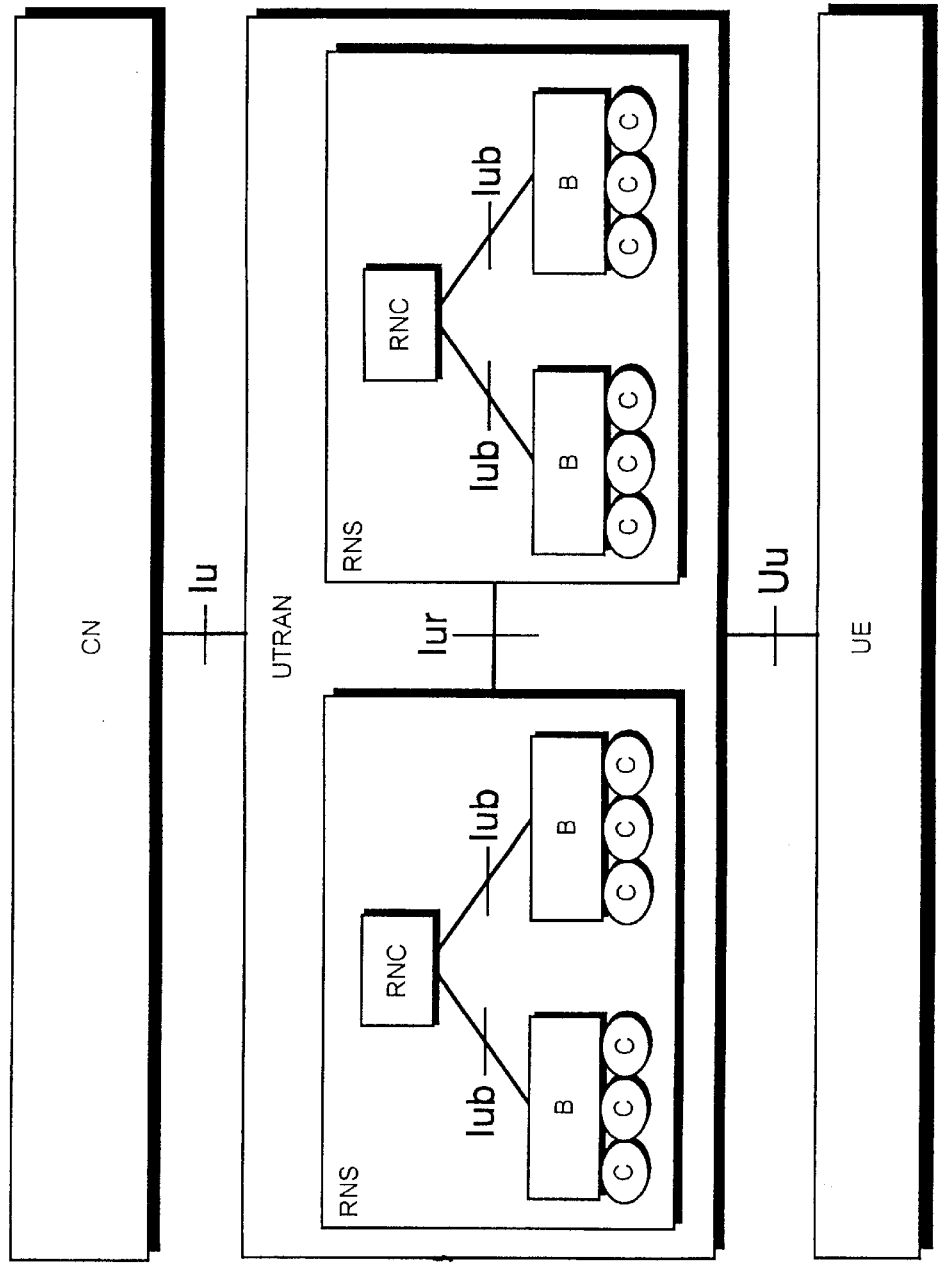
FIGS. 1A and 1B illustrate an example of a mobile phone system.
Figure 1B:
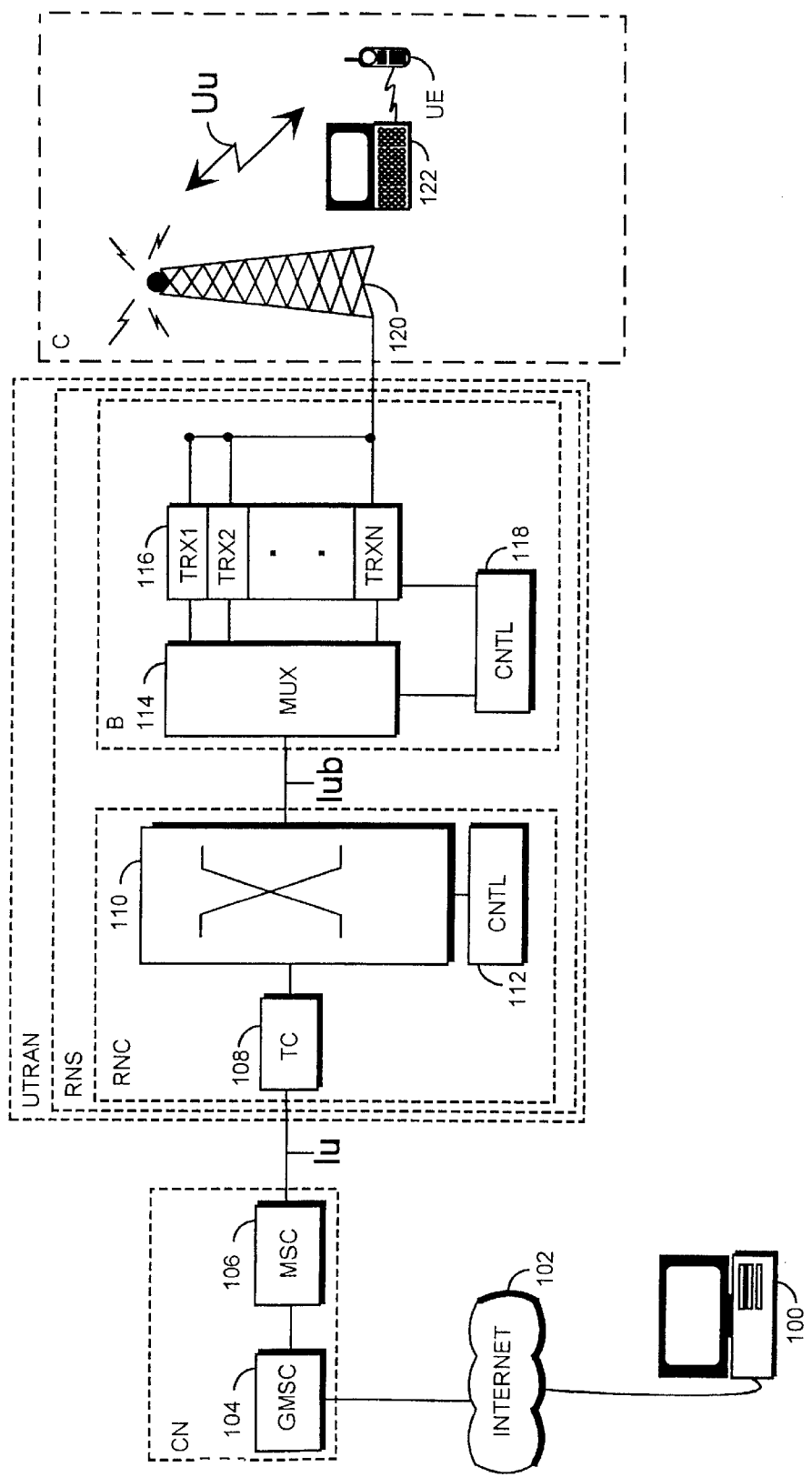

With reference to FIGS. 1A and 1B, a universal mobile telephone system structure will be described. FIG. 1B only comprises the blocks that are essential for the description of the invention, although it is apparent to a person skilled in the art that a common mobile telephone system also comprises other functions and structures, which need not be discussed in greater detail here. The main parts of the mobile telephone system are: a core network CN, a UMTS terrestrial radio access network UTRAN, and a user equipment UE. The interface between the CN and the UTRAN is called the lu interface, and the interface between the UTRAN and the UE is called the Uu interface.

The UTRAN is composed of radio network subsystems RNS. The interface between RNSs is called the lur interface. The RNS is composed of a radio network controller RNC and one or more nodes B. The interface between the RNC and a node B is called the lub interface. The reception area of the node B, i.e. a cell, is denoted by C in FIG. 1B.

As the presentation in FIG. 1A is very abstract, it is clarified in FIG. 1 B by setting forth the parts of the GSM system that correspond to the parts of the UMTS. It is clear that the presented mapping is by no means a binding one but an approximation, because the responsibilities and functions of the different parts of the UMTS are still being planned.

FIG. 1B illustrates packet switched transmission via the Internet 102 from a computer 100, connected with the mobile telephone system, to a portable computer 122 connected with a user equipment UE. The user equipment UE may be a fixedly mounted terminal, a vehicle-mounted terminal or a hand-held portable terminal, for example. The infrastructure of the radio network UTRAN is composed of radio network subsystems RNS, i.e. base station subsystems. A radio network subsystem RNS is composed of a radio network controller RNC, i.e. a base station controller, and at least one node B,. i.e. a base station, under the control of the RNC.

The node B comprises a multiplexer 114, transceivers 116, and a control unit 118 which controls the operation of the transceivers 114 and the multiplexer 116. The multiplexer 116 arranges the traffic and control channels used by a plurality of transceivers 114 on a transmission connection lub.

The transceivers 114 of the node B have a connection to an antenna unit 120 which is used for providing a bidirectional radio connection Uu to the user equipment UE. The structure of the frames transmitted on the bi-directional radio connection Uu is determined in detail.

The radio network controller RNC comprises a group switching field 110 and a control unit 112. The group switching field 110 is used for switching speech and data and for connecting signaling circuits. The node B and the radio network controller RNC form a base station subsystem, which additionally comprises a transcoder 108. The division of the functions and the physical structures of the radio network controller RNC and the node B may differ according to the actual implementation. Typically, the node B implements the radio path as described above. The radio network controller RNC typically manages the following: radio resources management, inter-cell handover control, power control, timing and synchronization, and paging of user equipment.

The transcoder 108 is usually located as close to a mobile switching center 106 as possible because this allows speech to be transmitted between the transcoder 108 and the radio network controller RNC in a cellular radio network form, which saves transmission capacity. The transcoder 108 converts different digital speech coding modes used between a public switched telephone network and a cellular radio network to make them compatible, for instance from the 64 kbit/s fixed network form to another form (such as 13 kbit/s) of the cellular radio network, and vice versa. The equipment needed will not be described in greater detail in this context, but it may be stated that other data than speech is not converted in the transcoder 122. The control unit 112 carries out call control, mobility management, collection of statistical data and signaling.

The core network CN is composed of the infrastructure belonging to the mobile telephone system which is not part of the UTRAN. FIG. 1B illustrates two equipments belonging to the core network CN, namely a mobile switching center 106, and a gateway mobile switching center 104, which handles mobile telephone system interfaces towards the outside world, in this example towards the Internet 102.

The user equipment may be for example a portable mobile phone, a vehicle mounted phone, a wireless local loop terminal or a computer-integrated data transmission equipment.

Figure 2A:
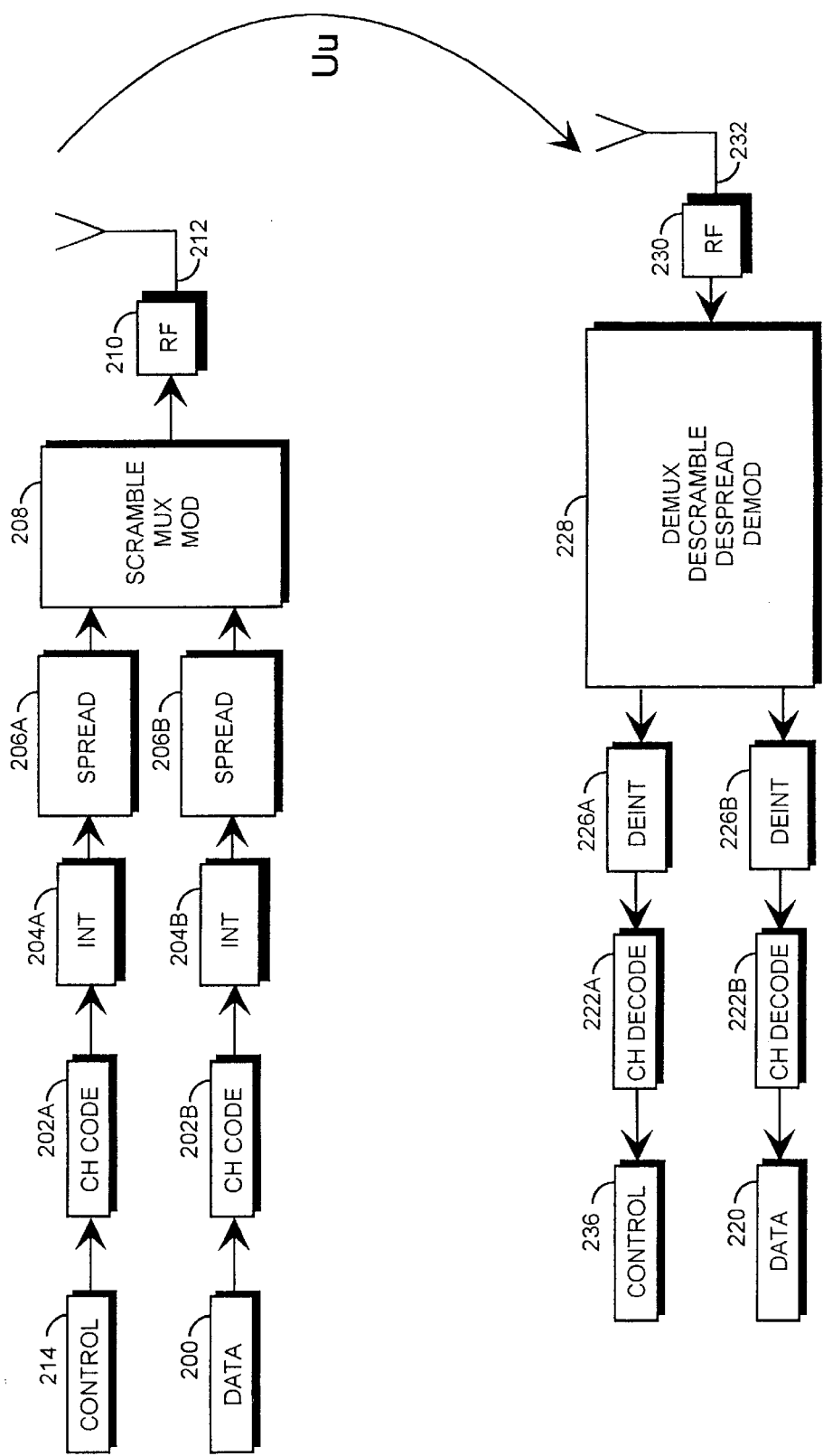
FIG. 2A illustrates an example of a transmitter and a receiver structure in a mobile phone system.

FIG. 2A illustrates the functioning of a radio transmitter/radio receiver pair. The radio transmitter may be located in the node B or in the user equipment UE. Correspondingly, the radio receiver may be located in the user equipment UE or in the node B.

The upper portion of FIG. 2A illustrates the essential functionality of the radio transmitter. The different services placed in a physical channel include speech, data, moving or still video picture, and the control channels of the system. The Figure shows the processing of a control channel and data. Different services call for different source encoding equipment: speech for example calls for a speech codec. For the sake of clarity, source encoding equipment is not, however, presented in FIG. 2A.

In the control channel 214 are also placed pilot bits used by the receiver in channel estimation. In the data channel is placed user data 200.

Different channels are then subjected to different channel coding in blocks 202A and 202B. Channel coding includes different block codes, such as a cyclic redundancy check CRC. In addition, convolution coding and its different variations, such as punctured convolution coding or turbo coding, are typically used. The pilot bits, however, are not channel coded because the aim is to find out the distortions a channel causes in a signal.

After the different channels have been channel coded, they are interleaved in an interleaver 204A, 204B. Interleaving aims at facilitating error correction. In interleaving, the bits of different services are mixed with each other in a predetermined manner, so an instantaneous fading on the radio path does not necessarily render the transferred information unidentifiable. The interleaved bits are then spread using a spreading code in blocks 206A, 206B. The chips obtained are then scrambled with a scrambling code and modulated in block 208, the separate signals being thus combined in block 208 for transmission via one and the same transmitter. The combining can be for example time multiplexing or IQ (in-phase quadrature) multiplexing.

In the end, the combined signal is conveyed to radio frequency parts 210 which may comprise different power amplifiers and filters restricting bandwidth. A closed loop control used in transmission power control usually controls a transmission power control amplifier located in this block. An analog radio signal is then transmitted via antenna 212 to radio path Uu.

The lower portion of FIG. 2A illustrates the essential functions of the radio receiver. The radio receiver is typically a RAKE receiver. An analog radio frequency signal is received over the radio path Uu via an antenna 232. The signal is transferred to radio frequency parts 230 which comprise a filter blocking frequencies outside the desired frequency band.

The signal is then converted in block 228 to an intermediate frequency or directly to baseband in which form the signal is sampled and quantized. Since the signal concerned is a multipath propagated signal, the aim is to combine the signal components that have propagated over different paths in block 228 which comprises, in accordance with the prior art, the actual RAKE fingers of the receiver. The operations taking place in block 228 thus comprise demultiplexing of the different channels, decoding of the scrambling code, despreading, and demodulation.

The channels obtained are then deinterleaved in deinterleaving means 226A, 226B. The channels are each directed to a specific channel decoding block 222A, 222B where the channel coding, such as block coding or convolution coding, used in the transmission is decoded. Convolution coding is preferably decoded by using a Viterbi decoder. Each transmitted channel 236, 220 can then be subjected to the necessary further processing, for example data 220 is transferred to a computer 122 connected to the user equipment UE. Control channels of the system are conveyed to the radio receiver's control part 236.

FIG. 2B illustrates in greater detail the spreading of the channel by the spreading code and the modulation of the channel, measures not essential for the spreading shown in FIG. 2A being left out. In the Figure a channel bit stream 250A enters from the left a multiplier 254A where the spreading is carried out by multiplying the bit stream 250A by a spreading code 252A. The spread channel obtained is multiplied in a multiplier 258A for transmission over a carrier 256A. Correspondingly, the signal received at the reception is multiplied in a multiplier 256B by a carrier 256B. Despreading is carried out by multiplying the received, demodulated signal by the spreading code 252B used in the multiplier 254B. Received bits 250B are obtained as a result, the bits being then deinterleaved and decoded as shown in FIG. 2A.

In accordance with prior art, a spreading code generator 260A, 260B is implemented by storing the spreading codes into the memory, or by storing into the memory a conversion matrix corresponding to each shift or at least to each shift corresponding to a power of two, the conversion matrix showing how each initial state element must be changed so as to obtain the elements of a new state. On the basis of the control data 262A, 262B, such as the ordinal number of the spreading code or the code class of the spreading code, the desired short spreading code 252A, 252B is fetched from the memory, or the linear feedback shift register is used to generate a desired long spreading code from a particular phase onwards.

In the invention the spreading code needed is generated on the basis of the control data 254A, 254B. The control data 254A, 254B provide the values of the initial state elements of the linear feedback shift register, and the offset of the desired target state from the initial state.

FIG. 2C illustrates a simple Galois-type linear feedback shift register, but it is evident that the principles also apply to longer feedback shift registers comprising 31 or 41 elements, for example. The linear feedback shift register in FIG. 2C comprises five elements 272, 274, 276, 278, 280.

The elements are also referred to as 'stages'. The elements are all inter-connected in such a way that the output of the first element 272 is connected to the input of the second element 274; the output of the second element 274 is connected to a summer 284 (to be explained below); the output of the summer 284 is connected to the input of the third element 276; the output of the third element 276 to the input of the fourth element 278; and the output of the fourth element 278 to the input of the fifth element 280. The output 290 of the linear feedback shift register in question is in fact the output 290 of the first element 272. The fifth element 280 has a feedback coupling 286 to the summer 284; the fifth element 280 also has a feedback coupling 288 to the first element 272. In the summer 284 an XOR operation is carried out, which means 'a logic exclusive or' operation. The truth table of the XOR operation is the following:

| A | B | A XOR B |
|---|---|---------|
| 0 | 0 | 0 |
| 0 | 1 | 1 |
| 1 | 0 | 1 |
| 1 | 1 | 0 |

The result obtained in the summer 284 by applying the XOR operation to the feedback coupling 286 and to the output of the second element 274 is thus connected as the input of the third element 276.

The feedback shift register illustrated in FIG. 2C generates an m sequence the length of which is $2^5-1=31$. A polynomial format of the contents of the feedback shift register in question is the following: $a_4x^4+a_3x^3+a_2x^2+a_1x+a_0 1$, the generator polynomial for the feedback shift register being $x^5+x^2+1$. FIG. 4A illustrates the contents of the feedback shift register of FIG. 2C in each different 31 phases, or states. At a time instant 0 the feedback shift register contains a neutral element of a Galois Field multiplication, i.e. a unit state, the value of which is 00001. The elements in the feedback shift register are numbered in FIG. 4A in such a way that the first element is number 0, the second element is 1, the third is 2, the fourth is 3 and the fifth is 4.

At a time instant 1 a state 00010 is generated, in accordance with the connection rules described in connection with FIG. 2C. Proceeding from one time instant to the next, the feedback shift register goes through all the 31 states it contains. At a time instant 31 the feedback shift register again receives the same state as at the time instant 0, and the cycle starts again. The described feedback shift register could be used for example for generating a long spreading code. For example, a Gold code of $2^{41}-1$ of an I branch can be generated by two feedback shift registers of 41 elements the generator polynoms of which are $x^{41}+x^3+1$ and $x^{41}+x^{20}+1$, and between the outputs of which is also performed an XOR operation to obtain the code chip.

Figure 3A:
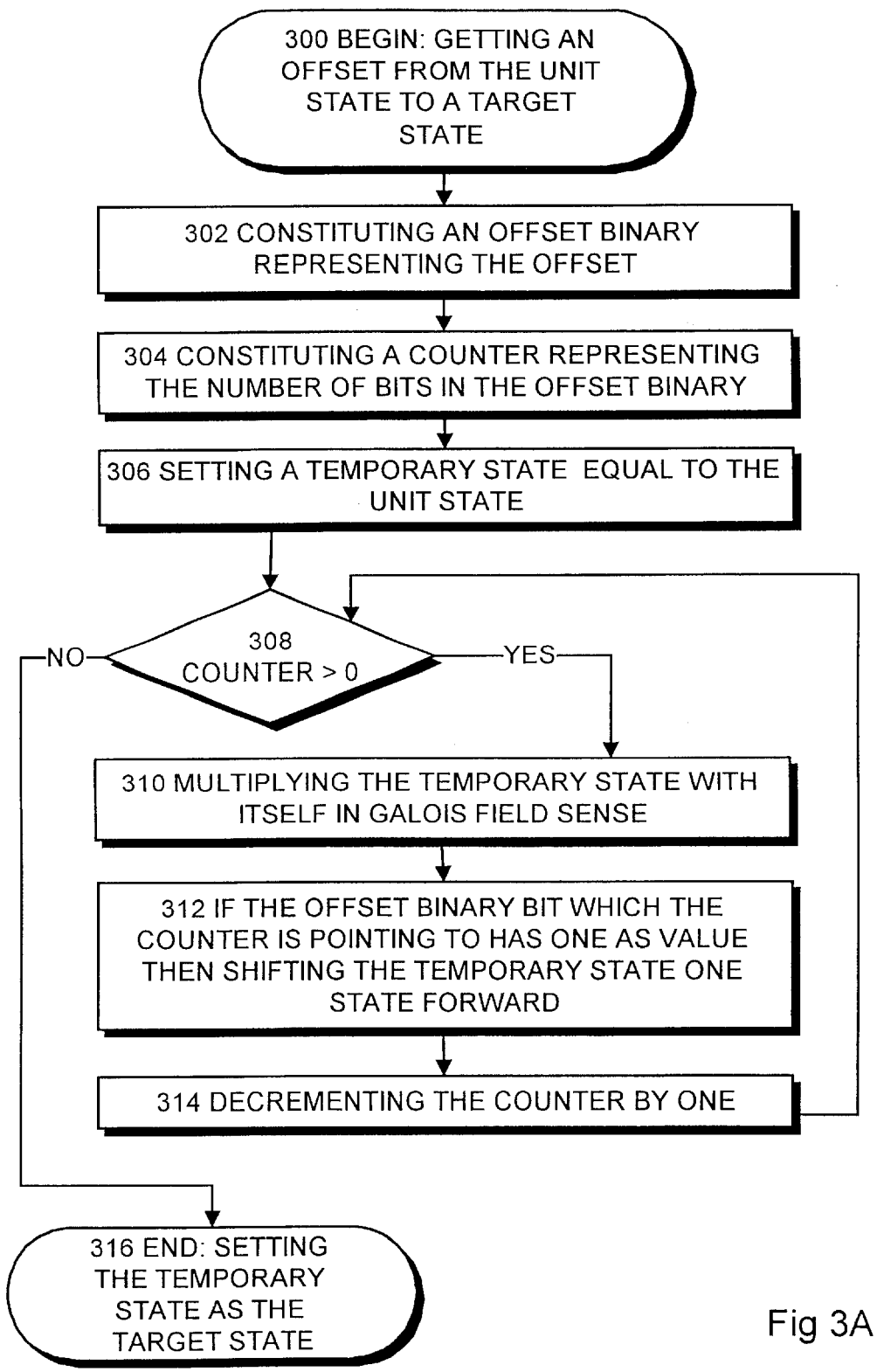
FIG. 3A is a flow chart illustrating a method for updating a linear feedback shift register of a code generator from a unit state to a target state.

FIG. 3A illustrates the method of the invention for updating the linear feedback shift register of the code generator to a target state located at a known offset from the unit state. Let us examine at the same time FIGS. 4A and 4B which illustrate the implementation of the method.

The implementation of the method starts at an initial block 300 where the known offset is obtained. The second column from the right in FIG. 4A shows that at a known offset OFFSET from the unit state UNIT STATE is an unknown target state TARGET STATE. The value of the known offset OFFSET is 21.

In block 302 is generated a binary offset number illustrating the offset, i.e. the OFFSET shown in FIG. 4B, the value of which is 10101.

In block 304 is generated a counter showing the number of bits in the binary offset number; in the example shown in FIG. 4B the counter receives the value 5.

In block 306 the temporary state is initialized using the unit state, i.e. the value of the temporary state is set at 00001.

Next, in block 308 is iterated the operation of blocks 310, 312, 314 as long as the counter value is higher than zero, in other words, in block 308 is tested whether the value of the counter is higher than zero. When the counter value reaches the value zero, the routine proceeds to block 316, otherwise it proceeds to block 310.

In block 308 the temporary state is multiplied by itself by applying a Galois Field multiplication described below in greater detail. Since the temporary state has been initialized by using the unit state, the unit state is raised to the power of two in the first cycle and since a neutral element of the Galois Field multiplication is concerned, its value does not change. In other words, the result is still a unit state with an ordinal number zero. The second line of the table in FIG. 4B illustrates this.

In block 310, if the value of the binary offset number bit denoted by the counter is one, the temporary state is shifted one state forward from the current temporary state. The counter value is 5, i.e. in the binary offset number OFFSET it denotes the fifth bit from the right, or the leftmost bit 1 in the number 10101. In accordance with the third line of the table in FIG. 4B, a shift SHIFT is made, the temporary state being shifted to state 00010.

In block 312 the counter value is decremented by one, a counter value 4 being thus obtained.

In the second iteration the temporary state with the contents 00010 is multiplied in block 310 by itself SQUARE, a state 00100 shown on line four being thus produced. The counter value is 4, i.e. it denotes the fourth bit from the right in the binary offset number OFFSET, i.e. the bit 0 in the number 10101. In accordance with the fourth line of the table in FIG. 4B, a shift is not made NO SHIFT in block 312. In block 312 the counter value is decremented by one, the counter value thus obtained being 3.

In the third iteration the temporary state is again multiplied by itself by using the Galois Field multiplication. The Galois Field multiplication SQUARE thus produces from the temporary state 00100 on line four a new temporary state 10000 on line six. The counter denotes the third bit, which has the value 1, in the binary offset number 10101, the temporary state on line six being thus shifted one state SHIFT forward, i.e. to the state 00101 shown on line seven. The counter receives the value 2.

In the fourth iteration the temporary state is again multiplied by itself by using the Galois Field multiplication. The temporary state 00101 on line seven multiplied by the Galois Field multiplication SQUARE thus produces a new temporary state 10001 shown on line eight. The counter denotes the second bit, which has the value 0, in the binary offset number 10101 and, in accordance with line nine of the table, the temporary state is not shifted NO SHIFT. The counter receives the value 1.

In the fifth iteration the temporary state is again multiplied by itself by using the Galois Field multiplication. The temporary state 10001 on line eight multiplied by the Galois Field multiplication SQUARE thus produces a new temporary state 01100 on line ten. The counter denotes the first bit, which has the value 1, in the binary offset number 10101, the temporary state on line ten thus being shifted one state forward SHIFT, i.e. to the state 11000 on line eleven. The counter receives the value 0.

Iteration is no longer continued because the counter has reached the value 0. The process is therefore completed in block 316 by setting the temporary state as the target state. In other words, the target state is the temporary state 11000 shown on line eleven of the table in FIG. 4B.

In connection with FIG. 3A a method was described that allows a state of a feedback shift register of a target state at a known distance to be produced from the unit state. The method shown in FIG. 3B uses the method illustrated in FIG. 3A for updating the linear feedback shift register of the code generator to a new state at a known offset from a known current state. The rightmost column in the table of FIG. 4A illustrates the relation between the concepts 'unit state', 'current state' and 'new state'. The meaning of the unit state UNIT STATE is the same as in the method of FIG. 3A. The term current state CURRENT STATE means the known state where the feedback shift register is. The term new state NEW STATE refers to an unknown state at a known offset OFFSET from the current state.

It is known that when two states and their ordinal numbers are known in the Galois Field, a state conforming to the sum of the ordinal numbers is obtained by multiplying the states by applying a Galois Field multiplication. It is essential in the invention that the states are examined with reference to the unit state in a manner described below.

According to the example shown in the rightmost column in FIG. 4A, the ordinal number of the current state CURRENT STATE is 9. The length of the known offset OFFSET is 18. As shown by an arrow drawn with a dashed line in FIG. 4A, the known offset OFFSET between the current state and the new state can be shifted between the unit state and an unknown state TEMP STATE. The unknown state TEMP STATE is now at the known offset OFFSET from the unit state, i.e. the unknown state TEMP STATE of the example has the ordinal number 18. The summation of the ordinal numbers of the current state CURRENT STATE and the unknown state TEMP STATE produces 9+18=27. Consequently, when the values of the elements in the feedback shift register of state 27 need to be known, a Galois Field multiplication must be performed between states 9 and 18.

Figure 3B:
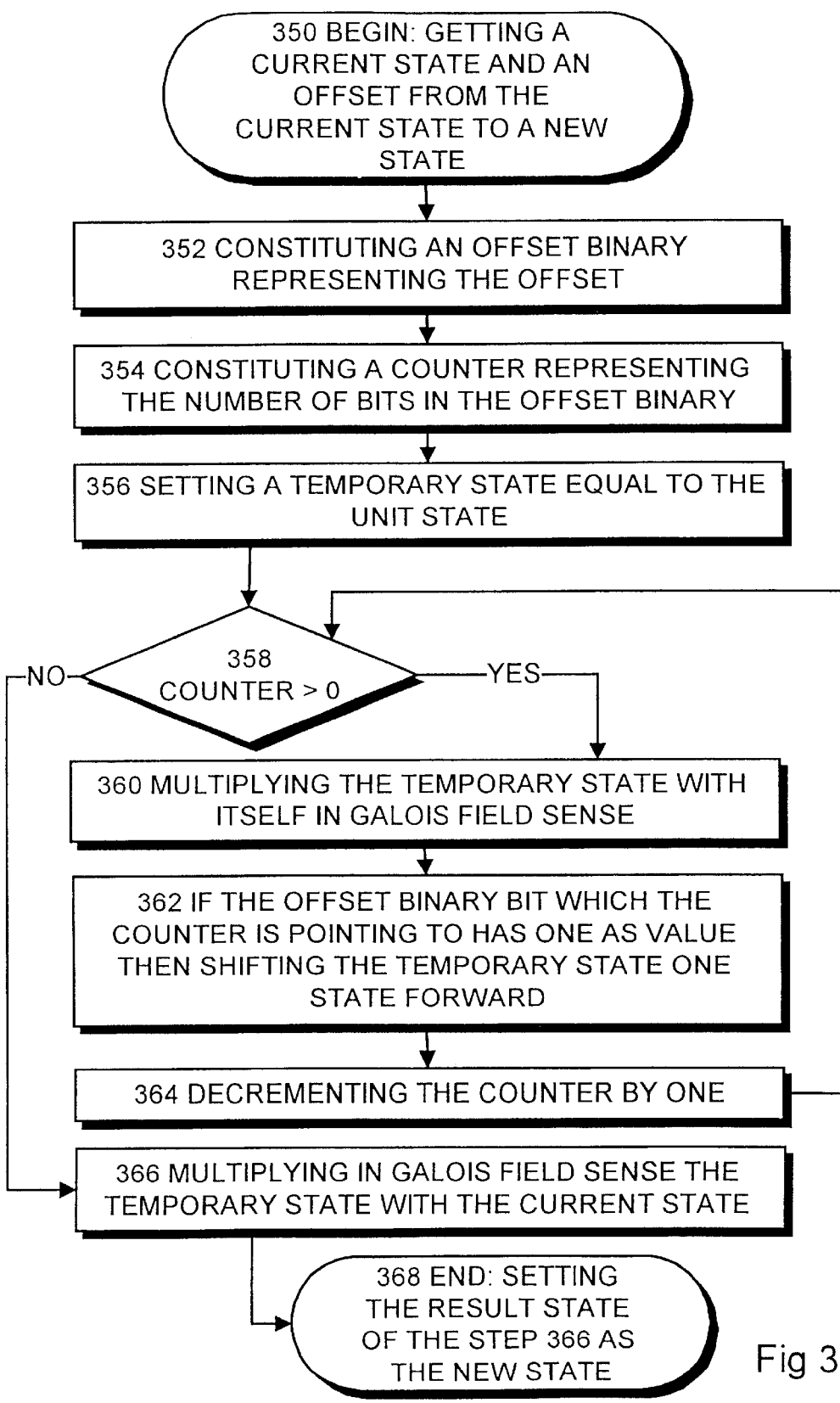
FIG. 3B is a flow chart illustrating a method for updating a linear feedback shift register of a code generator from a current state to a new state.

As shown in FIG. 3B, the method thus produces first the current state CURRENT STATE in block 350 and the known offset OFFSET from the current state CURRENT STATE to a so far unknown new state NEW STATE.

The blocks 352, 354, 356, 358, 360, 362, 364 in FIG. 3B mean the same as blocks 302, 304, 306, 308, 310, 312, 314 in FIG. 3A; therefore they are not described again in this context. The blocks in question are used for generating the above described unknown state TEMP STATE which is at the known offset OFFSET from the unit state UNIT STATE. When the routine proceeds from block 364 to block 366, the temporary state receives the value TEMP STATE described in FIG. 4A.

In block 366, after the counter has obtained the value 0, the temporary state TEMP STATE and the current state CURRENT STATE are multiplied by applying a Galois Field multiplication, i.e. in this example the temporary state TEMP STATE is state 18 and the current state CURRENT STATE is state 9. In block 368 a state obtained as a result of the multiplication is set as the new state NEW STATE, i.e. state 27 in our example.

Figure 3C:
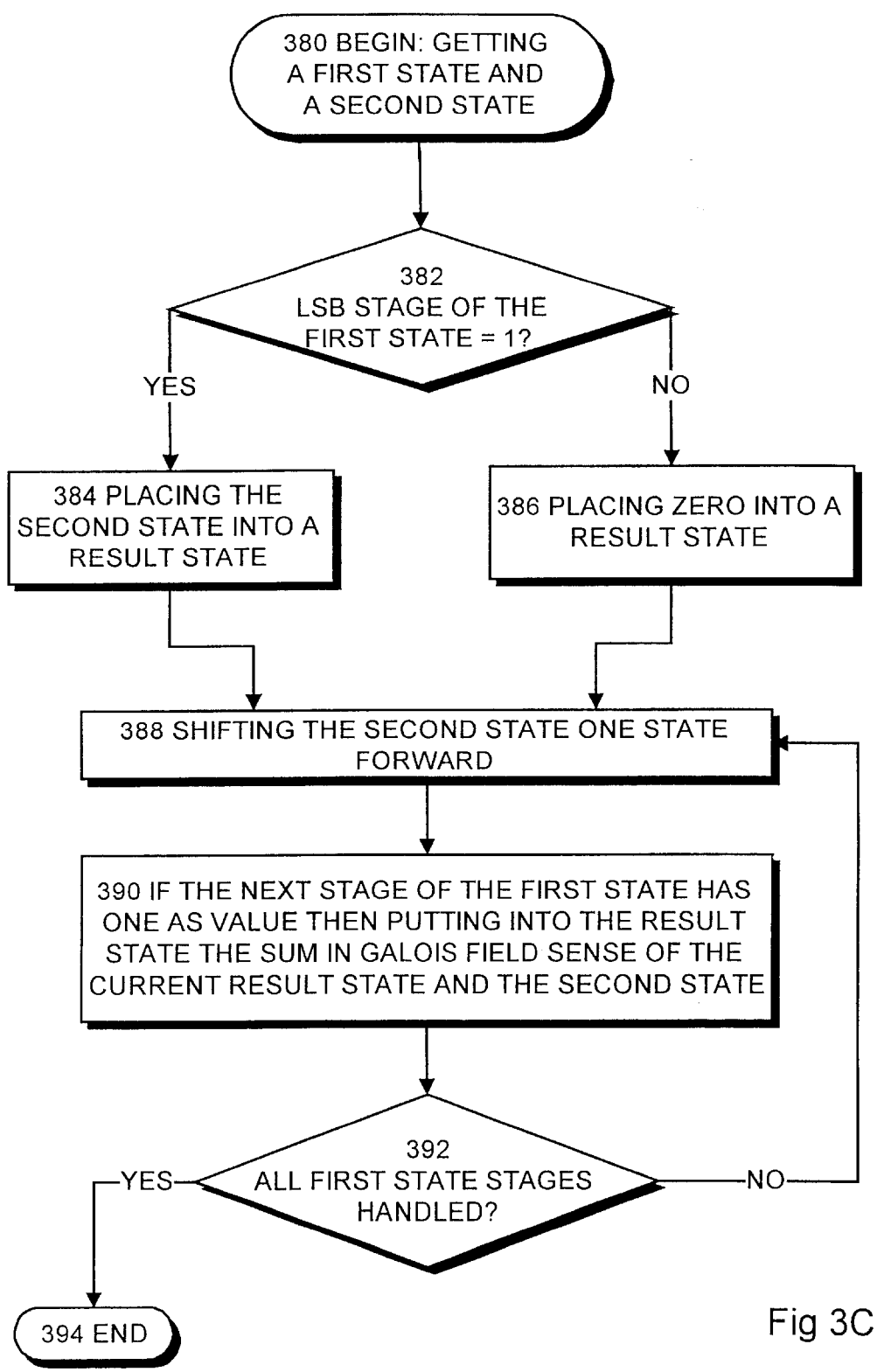
FIG. 3C is a flow chart illustrating an example a Galois Field multiplication.

FIG. 3C shows a way of performing the Galois Field multiplication. FIG. 4C illustrates how the operation of the method of FIG. 3B that was carried out in block 366 is performed, i.e. a Galois Field multiplication between two known states. The first state is state 18 and the second state is state 9.

The Galois Field multiplication between the first state and the second state is carried out as follows. The first state and the second state are obtained in block 380. In block 382, if the value of the element corresponding to the least significant bit in the first state is one, the routine proceeds to block 384 where the second state is placed in the result state, otherwise the routine proceeds to block 386 where zero is placed in the result state. In FIG. 4C the first state is the eighteenth state THE 18TH STATE having a feedback shift register with element values 00011. The least significant bit is the rightmost bit, i.e. the value of the element corresponding to the least significant bit in the eighteenth state THE 18TH STATE is one, and the routine then proceeds to block 384 where the ninth state is placed in the result state, i.e. the first line of the table, which has the value 11010.

Block 392 is used for iterating the operations of blocks 388 and 390 for each first state element in turn, starting from the element following the element that corresponds to the least significant bit. This means that in the example shown in FIG. 4C the operations of blocks 388, 390 are carried out four times.

In block 388 the feedback shift register of the second state is shifted one state forward, i.e. to a state 10, which has a value 10001, on the second line of the table in the example shown in FIG. 4C.

In block 390 the result state and the second state are multiplied by applying a Galois Field multiplication if the value of the first state element to be processed is one. The state obtained as a result of the multiplication is placed in the result state. In the example of FIG. 4C the value of the second element from the right in the first state is one. As stated, a Galois Field summation of the output state and the second state is performed in this case. The Galois Field summation is carried out by applying an XOR operation. The XOR operation performed between the result state having the value 11010 and the second state having the value 10001 provides a state 01011, which is placed as the result state.

Steps 390 and 392 are repeated three more times as shown in FIG. 4C, but they do not affect the value of the result state anymore because the third, fourth and fifth element from the right all have zero value. Consequently, the final value of the result state is 01011. This can be checked from FIG. 4A which shows that the value of the feedback shift register of the $27^{th}$ state indeed is 01011.

The m sequence generated by the Galois-type linear feedback shift register described in FIG. 2C can also be generated by the Fibonacci-type linear feedback register shown in FIG. 2D. The reference numerals used in FIG. 2D have the same meaning as those in FIG. 2C, therefore they are not repeated in this context anymore. It is to be noted, however, that the connections between the elements are different: the output of the fifth element 280 is connected to the input of the fourth element 278, the output of the fourth element 278 is connected to the input of the third element 276, the output of the third element 276 to the input of the second element 274, and outuput of the second element 274 to the input of the first element 272. The feedback coupling is also different: from the first element 272 there is a feedback coupling 294 to the summer 284, from the third element is also a feedback coupling 294 to the summer 284, and from the output of the summer 284 is a feedback coupling 296 to the fifth element 280.

The linear feedback shift registers of the Galois-type and the Fibonacci-type expressed for the generator polynomial $x^5+x^2+1$ are equivalent. Equivalence means that if the ordinal numbers of the initial states are the same, the outputs 290 of the feedback shift registers provide the same m sequence as a result. The ordinal number of a state indicates how many times the feedback shift register must be iterated in order to provide a feedback shift register content that is the same as the state in question, with a unit state as the initial state, i.e. state 00001 in the examples.

The Galois Field multiplication can also be carried out in such a way that one of the states to be multiplied is a Fibonacci-type state and the other is a Galois-type state, the result obtained being a Fibonacci-type state. The ordinal numbers of the states are summed in particular, in other words, the ordinal number of the result state is the sum of the ordinal numbers of the states to be multiplied. The method shown in FIG. 3B where the Galois-type linear feedback shift register of the code generator is updated to a new state at a known offset from the known current state can thus be converted to a method for updating the Fibonacci-type linear feedback shift register of the code generator to a new state at a known offset from the known current state. This invention provides the advantage that by processing the Galois-type feedback shift register it is also possible to update the Fibonacci-type feedback shift register.

FIG. 4D illustrates both the states of the Galois-type linear feedback shift register of FIG. 2C and the states of the Fibonacci-type linear feedback shift register of FIG. 2D. An essential feature in this embodiment is that in both feedback shift registers the state that has the ordinal number one must be the neutral element, i.e. the unit state, in the Galois Field multiplication. 19

Although the feedback shift registers of the Galois-type and the Fibonacci-type go through the Galoid Field elements in different order, i.e. in the Fibonacci-type the state corresponding to the ordinal number 10 is 10011 and in the Galois-type it is 10001, the procedure is nevertheless reasonable because in both types the rightmost element of the states, i.e. the output of the feedback shift register, is the same, i.e. 1.

The method illustrated in FIG. 3B is used for processing the Fiboncacci-type feedback shift register in such a way that the known current state of the Fibonacci-type and the new state, which is at a known offset from the current state, are obtained. The method is carried out in this case exactly as in FIG. 3B, i.e. the blocks 352, 354, 356, 358, 360, 362 and 364 are carried out. It is to be noted that the temporary state applied represents the Galois-type. In the end, when the counter reaches the value zero, a Galois Field multiplication is carried out between the Galois-type temporary state and the Fibonacci-type current state in block 366, and in block 368 the state obtained as a result of the multiplication is set as the new state of the Fibonacci-type.

Figure 3D:
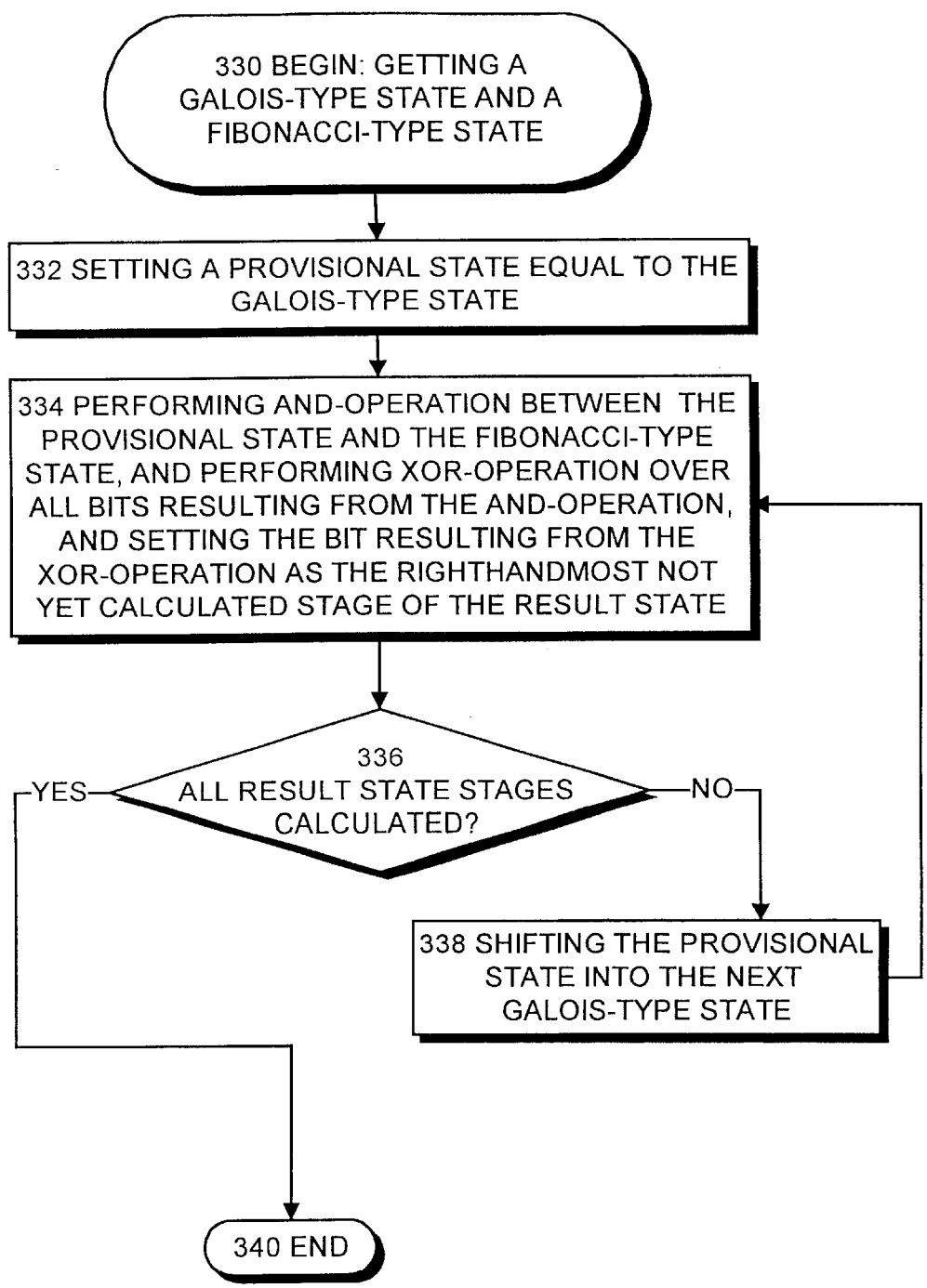
FIG. 3D is a flow chart illustrating a Galois Field multiplication between a Fibonacci-type state and a Galois-type state.

The Galois Field multiplication between the Galois-type state and the Fibonacci-type state is carried out as shown in FIG. 3D, the example in FIG. 4E illustrating the multiplication. The ordinal numbers in the table given in the example of FIG. 4E show that the Galois-type state is the eighteenth Galois-type state and has the value 00011 and the Fibonacci-type state is the ninth Fibonacci-type state and has the value 00110.

In block 332 the temporary state is initialized by applying the Galois-type state, i.e. in our example the value 00011 is placed in the temporary state.

In block 334 is performed an AND operation between the temporary state and the Fibonacci-type state; an XOR operation is carried out between all the bits received as a result of the AND operation; and the bit obtained as a result of the XOR operation is placed into the result state as the rightmost, not yet calculated element. The AND operation refers to a 'logical and' operation having the following truth table:

| A | B | A AND B |
|---|---|---------|
| 0 | 0 | 0 |
| 0 | 1 | 0 |
| 1 | 0 | 0 |
| 1 | 1 | 1 |

In our example, an AND operation is thus carried out between the Fibonacci state on the first line and the temporary state on the second line of the table in FIG. 4E, the result of the operation being the state 00010 shown on the third line of the table. The XOR operation described above is carried out between all the bits in the state obtained as a result of the AND operation, the result of the operation being one bit with the value 1, which is placed into the result state as the rightmost, not yet calculated element. Since the result state does not contain any calculated bits yet, the bit obtained by means of the XOR operation is placed as the first bit from the right in the result state.

A test is carried out in block 336: if all result state elements have been calculated, the routine proceeds to block 340 where the multiplication process is brought to an end, otherwise the routine proceeds to block 338 where the temporary state is shifted one state forward and the multiplication is continued from the second process step, i.e. from block 334.

In our example only the first result state element has been calculated, therefore the routine proceeds to block 338 where the temporary state is shifted one state forward, i.e. the Galois-type state with the ordinal number 18 is shifted to the Galois-type state with the ordinal number 19. The operation of block 334 is then carried out and, as a result, the second bit from the right in the result state is obtained. The operation of blocks 336, 338 and 334 is then iterated until all the bits in the result state are calculated, i.e. in our example until five bits have been calculated for the result state. The routine then proceeds to block 340 where the multiplication process is brought to an end. The result thus obtained is a Fibonacci-type state with ordinal number 27 and value 10101. This can still be checked from the table in FIG. 4D and confirmed as correct.

The examples illustrate a software implementation of the invention. The spreading code generator can also be implemented as an ASIC (Application Specific Integrated Circuit). It is apparent to a person skilled in the art that the described iterative solution, or an unrolled solution, can be used in an ASIC implementation. The implementation can also be carried out as a conventional HW implementation using separate components. An implementation based on software alone is also possible; in such case a sufficiently efficient processor is required to allow the value of a chip in the spreading code in question to be calculated, when necessary, during the chip concerned. FIG. 2B shows the parts to be used in a software implementation. In principle the code generator 260A then comprises software 264, a processor 266 for running the software, and a memory 268 for storing the necessary data. The parts 264, 266 268 are used for implementing the means needed in the method of the example 3A for generating a binary offset number representing a known offset from a unit state of a Galois-type linear feedback shift register to a target state; means for generarating a counter showing the number of bits in the binary offset number; means for initializing a temporary state with the unit state; means for iterating the operation of subsequent means as long as the value of the counter is higher than zero: means for multiplying the temporary state by itself by applying a Galois Field multiplication; means for shifting the temporary state one state forward from the current temporary state if the value of the binary offset number bit shown by the counter is one; and means for decrementing the counter value by one; means for setting, in the end, the temporary state as the target state when the counter has reached the value zero. Means according to example 3B and means according to example 3C for performing Galois Field multiplication and, in addition, means for processing Fibonacci-type linear feedback shift registers are implemented correspondingly.

Although the invention is described above with reference to an example according to the accompanying drawings, it is apparent that the invention is not restricted to it, but may vary in many ways within the inventive idea disclosed in the claims.

What is claimed is:

1. A method for updating a Galois-type linear feedback shift register of a code generator to a new state which is at a known offset from a known current state, comprising:
   generating a binary offset number illustrating the offset;
   generating a counter showing the number of bits in the binary offset number;
   initializing a temporary state with a unit state;
   iterating as long as the value of the counter is higher than zero:
      applying a Galois Field multiplication to multiply the temporary state by itself;
      shifting the temporary state one state forward from the current temporary state if the value of the binary offset number bit shown by the counter is one; and decrementing the counter value by one;
      in the end, when the counter has reached the value zero, performing a Galois Field multiplication between the temporary state and the current state, and setting the state obtained as a result of the multiplication as the new state.

2. A method according to claim 1, wherein the Galois Field multiplication between a first state and a second state is performed as follows:
   if the value of the element corresponding to the least significant bit in the first state is one, the second state is placed in the result state, otherwise zero is placed in the result state;
   iterating for each first state element in turn, starting from the element following the element corresponding to the least significant bit:
      shifting the feedback shift register of the second state one state forward; and
      if the value of the first state element to be processed is one, performing a Galois Field summation between the result state and the second state, and placing the state obtained as a result of the summation as the result state.

3. A method according to claim 2, wherein the Galois Field summation is carried out by applying an XOR operation.

4. A method according to claim 2 wherein the first state is the temporary state and the second state is the current state.

5. A method according to claim 2 wherein the first state is the temporary state and the second state is the temporary state.

6. A method according to claim 1, wherein a code generated by means of the linear feedback shift register is a code of a radio system applying code division multiple access.

7. A method for updating a Fibonacci-type linear feedback shift register of a code generator to a new state which is at a known offset from a known current state, comprising:
   generating a binary offset number illustrating the offset;
   generating a counter showning the number of bits in the binary offset number;
   initializing a Galois-type temporary state with a unit state;
   iterating as long as the value of the counter is higher than zero:
      applying a Galois Field multiplication to multiply the temporary state by itself;
      shifting the temporary state one state forward from the current temporary state if the value of the binary offset number bit shown by the counter is one; and
      decrementing the counter value by one; in the end, when the counter has reached the value zero, performing a Galois Field multiplication between the Galois-type temporary state and the Fibonacci-type current state, and setting the state obtained as a result of the multiplication as the new state of the Fibonacci-type.

8. A method according to claim 7, wherein the Galois Field multiplication between the Galois-type state and the Fibonacci-type state is performed as follows:
   initializing the temporary state with the Galois-type state;
   performing an AND operation between the temporary state and the Fibonacci state, and performing an XOR operation between all the bits obtained as a result of the AND operation, and placing the bit obtained as a result of the XOR operation into the result state as the rightmost, not yet calculated element;
   if all the elements in the result state have been calculated, completing the multiplication process, otherwise shifting the temporary state to the next Galois-type state and continuing the multiplication from the second process step.

9. A code generator in a radio system comprising:
   means for generating a binary offset number illustrating a known offset from a known current state of a Galois-type linear feedback shift register to a new state;
   means for generating a counter showing the number of bits in the binary offset number;
   means for initializing a temporary state with a unit state;
   means for iterating the operation of subsequent means as long as the counter value is higher than zero:
   means for applying a Galois Field multiplication to multiply the temporary state by itself;
   means for shifting the temporary state one state forward from the current temporary state if the value of the binary offset number bit shown by the counter is one; and
   means for decrementing the counter value by one;
   means for multiplying the temporary state and the current state by applying the Galois Field multiplication, and for setting the state obtained as a result of the multiplication as the new state when the counter has reached the value zero.

10. A code generator according to claim 9, wherein the means for performing the Galois Field multiplication between a first state and a second state comprises:
- means for placing the second state in the result state if the value of the element corresponding to the least significant bit in the first state is one, otherwise for placing zero into the result state;
- means for iterating the operation of the subsequent means for each first state element, starting from the element following the element corresponding to the least significant bit;
- means for shifting the feedback shift register of the second state one state forward; and
- means for performing a Galois Field summation between the result state and the second state if the value of the first state element to be processed is one, and for placing the state obtained as a result of the summation to the result state.

11. A code generator according to claim 10 wherein the first state is the temporary state and the second state is the current state.

12. A code generator according to claim 10 wherein the first state is the temporary state and the second state is the temporary state.

13. A code generator according to claim 10, wherein the means for performing a Galois Field summation use an XOR operation.

14. A code generator according to claim 9, wherein the radio system is a radio system applying code divisional multiple access.

15. A code generator in a radio system comprising:
- means for generating a binary offset number illustrating a known offset from a known current state of a Fibonacci-type linear feedback shift register to a new state;
- means for generating a counter showing the number of bits in the binary offset number;
- means for initializing a Galois-type temporary state with a unit state;
- means for iterating the operation of subsequent means as long as the counter value is higher than zero:
  - means for applying a Galois Field multiplication to multiply the temporary state by itself;
  - means for shifting the temporary state one state forward from the current temporary state if the value of the binary offset number bit shown by the counter is one; and
  - means for decrementing the counter value by one;
- means for multiplying the Galois-type temporary state and the Fibonacci-type current state by applying the Galois Field multiplication, and for setting the state obtained as a result of the multiplication as the new state of the Fibonacci-type when the counter has reached the value zero.

16. A code generator according to claim 15, wherein the means for performing a Galois Field multiplication between a Galois-type state and a Fibonacci-type state comprise:
- means for initializing a temporary state with a Galois-type state;
- calculation means for performing an AND operation between the temporary state and the Fibonacci-type state, and to perform an XOR operation between all the bits obtained as a result of the AND operation, and to place the bit obtained as a result of the XOR operation into the result state as the rightmost, not yet calculated element;
- means for completing the multiplication process if all result state elements have been calculated;
- means for shifting the temporary state to the next Galois-type state and to continue the multiplication process by applying the calculation means if all the result state elements have not been calculated.

* * * * *